(12) United States Patent
Burns et al.

(10) Patent No.: US 7,117,369 B1
(45) Date of Patent: Oct. 3, 2006

(54) PORTABLE SMART CARD SECURED MEMORY SYSTEM FOR PORTING USER PROFILES AND DOCUMENTS

(75) Inventors: Gregory Burns, Seattle, WA (US); Giorgio J. Vanzini, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/304,444

(22) Filed: May 3, 1999

(51) Int. Cl.
*H04K 1/00* (2006.01)

(52) U.S. Cl. .................. 713/182; 713/172; 713/168; 726/20

(58) Field of Classification Search ............. 713/200, 713/201, 202, 172, 185, 191, 171, 168; 235/380, 235/375; 726/9, 20; 380/30
See application file for complete search history.

(56) References Cited

U.S. PATENT DOCUMENTS

| | | |
|---|---|---|
| 4,727,244 A | 2/1988 | Nakano et al. |
| 5,438,354 A | 8/1995 | Genovese |
| 5,438,359 A | 8/1995 | Aoki |
| 5,594,227 A * | 1/1997 | Deo ........................... 235/380 |
| 5,623,637 A * | 4/1997 | Jones et al. ................. 711/164 |
| 5,671,229 A | 9/1997 | Harari et al. |
| 5,679,007 A | 10/1997 | Potdevin et al. |
| 5,710,884 A | 1/1998 | Dedrick |
| 5,778,087 A | 7/1998 | Dunlavy |
| 5,844,218 A | 12/1998 | Kawan et al. |
| 5,860,157 A | 1/1999 | Cobb |
| 5,877,488 A | 3/1999 | Klatt et al. |
| 5,887,145 A * | 3/1999 | Harari et al. ................ 710/301 |
| 5,890,016 A | 3/1999 | Tso |
| 5,955,722 A | 9/1999 | Kurz et al. |
| 5,987,138 A * | 11/1999 | Gilbert et al. ................. 380/30 |
| 6,003,135 A | 12/1999 | Bialick et al. |
| 6,015,092 A | 1/2000 | Postlewaite et al. |
| 6,038,551 A | 3/2000 | Barlow et al. |
| 6,053,775 A | 4/2000 | Untgermann et al. |
| 6,069,795 A | 5/2000 | Klatt et al. |
| 6,148,354 A | 11/2000 | Ban et al. |
| 6,178,507 B1 * | 1/2001 | Vanstone ..................... 713/169 |
| 6,234,389 B1 | 5/2001 | Valliani et al. |
| 6,266,416 B1 * | 7/2001 | Sigbjørnsen et al. ....... 380/255 |
| 6,315,205 B1 | 11/2001 | Bates, III |
| 6,351,813 B1 * | 2/2002 | Mooney et al. ............. 713/185 |

(Continued)

FOREIGN PATENT DOCUMENTS

| WO | WO 96/08755 | 3/1996 |
|---|---|---|
| WO | WO 98/55912 | 12/1998 |

OTHER PUBLICATIONS

Kutler, Smart Cards: Schlumberger IF System to Add Biometric Feature, Dec. 1998, American Banker, vol. 163, p. 13.*

(Continued)

*Primary Examiner*—Hosuk Song
*Assistant Examiner*—Paula Klimach
(74) *Attorney, Agent, or Firm*—Lee & Hayes PLLC

(57) ABSTRACT

A portable profile carrier stores and securely transports a user's profile and data files from one computer to the next. The profile carrier is a two-component system comprising a smart card and a memory device. The smart card protects access to the memory device and authenticates a user via a passcode challenge. The composite profile carrier enables access to the user profile on the memory device when the smart card is present and the user is authenticated, and disables access when the smart card is absent or the user is not authenticated.

14 Claims, 4 Drawing Sheets

U.S. PATENT DOCUMENTS 6,353,885 B1 * 3/2002 Herzi et al. .................. 713/1
6,438,638 B1    8/2002 Jones et al.
2001/0011341 A1 * 8/2001 Hayes, Jr. et al. ............ 712/11

OTHER PUBLICATIONS

Kulter, Smart Cards: Schlumberger IF System to Add Biometric Feature, Dec. 1998, American Banker, vol. 163, p. 13.*

* cited by examiner

PORTABLE SMART CARD SECURED MEMORY SYSTEM FOR PORTING USER PROFILES AND DOCUMENTS

TECHNICAL FIELD

This invention relates to systems and methods for transporting user profiles and data files from one computer to another. More particularly, this invention relates to a portable profile carrier that enables a user to securely store and transport a user profile and personal data files, while allowing the user to access the profile and data files during log on processes at a standalone or networked computer so that the computer retains the same 'look and feel' of the user's desktop and setup.

BACKGROUND

Profiles are used by operating systems to configure operating characteristics of a computer (e.g., user interface schema, favorites lists, etc.) according to user-supplied preferences and provide storage for the user's personal data files (e.g., files on the desktop or in the user's "My Documents" folder). Windows NT operating systems from Microsoft Corporation supports two types of profiles: local profiles and roaming profiles. A local profile is stored and loaded from a fixed location on the local computer. The profile remains at the computer, and is not portable to another computer. Thus, if the user logs onto another computer, a new profile is created for that user from a default profile. As a result, the user ends up with different profiles on each machine that he/she logs onto and hence, each machine looks and feels differently.

A roaming profile travels with the user in a networked environment and is made available to the user regardless of which machine the user logs onto. FIG. 1 shows a client-server architecture 20 that implements conventional roaming profiles. The architecture 20 includes a server 22 connected to serve a client 24 over a network 26. The server 22 has an operating system 28 and a profile store 30 that holds various user profiles. The profiles are associated with the users via a passcode. The client 24 runs an operating system 32.

When the user logs onto the client 24, the user is initially prompted for a user name, domain name, and password. The domain name is used to identify the server 22 and the user name is used to locate a corresponding user profile from the profile store 30. If a profile exists (i.e. the user name is known to the server), the password is used in a challenge response exchange with the server to verify the identity of the user. If the user provided the correct password for the given user name, the user's profile is downloaded from the server 22 to the client 24 and used to configure the client according to the user's preferences.

If additional security is warranted, the architecture may further include smart card tokens. The user is assigned a personal smart card and inserts the smart card into a card reader at the client. In this case, the user name, domain name, and password are stored on the smart card. Instead of the user entering this information, the user enters a passcode that unlocks the card and makes the information available to the client, which then performs the logon process as described above.

One drawback with the roaming architecture is that users have only limited control over their own profiles. A user cannot, for instance, establish a roaming profile without the assistance of a network administrator. The administrator must assign a roaming profile pathname in the user's account on the domain server. The user then has the option to indicate on each machine whether to use a roaming profile or a local profile.

Another drawback with roaming profiles is that the architecture restricts roaming to clients connected to the network 26 with access to the domain server and the profile server 22. The architecture does not allow a user to access his/her profile on a home computer or other standalone computer that is not network attached.

Accordingly, there is a need for a portable device that securely transports a user's profile and related documents (My Documents) to various machines, regardless of whether the machines are connected or standalone. The inventors have developed such a device.

SUMMARY

This invention concerns a portable profile carrier that stores and securely transports a user's profile and personal user data files from one computer to the next.

The profile carrier is a two-component system comprising a smart card (or other integrated circuit (IC) card with processing capabilities) and a memory device. The user profile and personal data files are stored in the memory device. The smart card protects access to the memory device. The composite profile carrier alternately enables access to the user profile on the memory device when the card is present and the user is authenticated, while disabling access when the card is absent or the user is not authenticated.

In one implementation, the profile carrier is assigned a pair of public and private keys, with the public key being stored on the memory device and the private key being kept on the smart card. The smart card also stores a passcode that is unique to the user. To access the contents in the memory device, the user is prompted to enter a passcode and the smart card authenticates the user by comparing the user-supplied passcode to the stored passcode. Assuming that the user is legitimate, the smart card then authenticates the memory device as belonging to the user by determining whether the public key is complementary with the private key. If it is, access to the user profile and personal data files on the memory device is permitted.

BRIEF DESCRIPTION OF THE DRAWINGS

The same numbers are used throughout the figures to reference like components and features.

DETAILED DESCRIPTION

This invention concerns a portable profile carrier for transporting a user's profile and personal data files from one computer to the next in order to configure each computer according to user preferences. The profile carrier is equipped with sufficient memory to hold data files as well as the user profile. In one implementation, the profile and data files are secured, in part, using cryptographic techniques. Accordingly, the following discussion assumes that the reader is familiar with cryptography. For a basic introduction of cryptography, the reader is directed to a text written by Bruce Schneier and entitled "Applied Cryptography: Protocols, Algorithms, and Source Code in C," published by John Wiley & Sons with copyright 1994 (second edition 1996).

System

Figure 1:
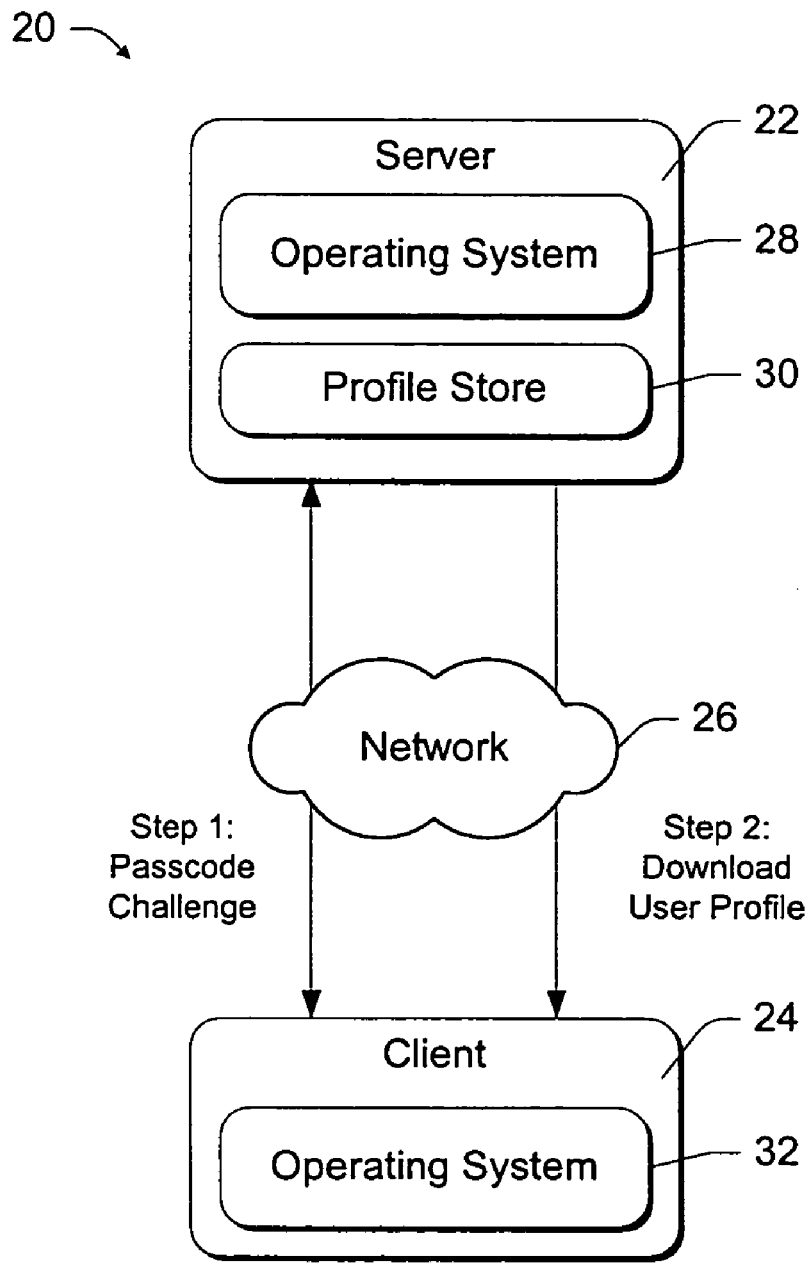
FIG. 1 is a block diagram of a prior art client-server system that supports roaming profiles from one network client to another.
Figure 2:
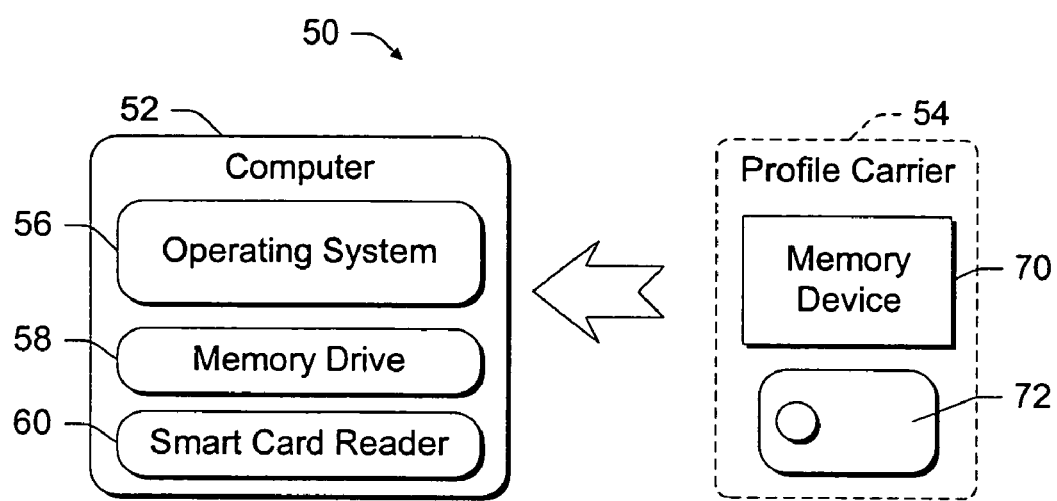
FIG. 2 is a block diagram of a system having a portable profile carrier that securely transports user profiles and data files from computer to computer. The portable profile carrier, in conjunction with the computer operating system, enables authenticated access to the profiles and data files at a computer, regardless of whether the computer is a standalone or networked.

FIG. 2 shows a computer system 50 having a computer 52 and a portable profile carrier 54. The computer 52 has an operating system 56, a memory drive 58, and a smart card reader 60. The computer may be configured as a general-purpose computer (e.g., desktop computer, laptop computer, personal digital assistant, etc.), an ATM (automated teller machine), a kiosk, an automated entry system, a set top box, and the like. The machine 52 may be a standalone unit or networked to other computers (not shown).

The profile carrier 54 stores a user's profile in a secured medium that can be conveniently transported. The profile consists of user information that can be used to configure computer 52 according to selected preferences and schema of the user. The profile contains essentially all of the information that is useful or personal to the user. For instance, a profile might include a user's name, logon identity, access privileges, user interface preferences (i.e., background, layout, etc.), mouse control preferences (i.e., click speed, etc.), favorites lists, personal address book, the latest electronic mail (sorted according to user criteria) and so forth. One can also envision that application tokens or keys can be stored on the carrier, and that will allow the user to access or use the applications for which he/she has tokens or keys.

The profile carrier 54 has two components: a memory device 70 and an integrated circuit (IC) card 72. The IC card has a form factor of a card and is equipped with memory and processing capabilities. The IC card is preferably embodied as a smart card. The memory device 70 can be constructed in many different forms, including floppy diskette, PCMCIA flash memory card (or PC card), Zip memory drive, and other persistent read/write memories.

According to this architecture, the two-component profile carrier forms a smart card secured memory system that alternately enables access to the user profile and personal data files on the memory device 70 when the smart card 72 is present, while disabling access when the smart card is absent. The smart card 72 is associated with the user (e.g., via a passcode, like an ATM card) to ensure that only the legitimate user can access the smart card. In addition, the memory device 70 and smart card 72 are associated with one another (e.g., by sharing a public/private key pair) to securely link the legitimate user to the user profile and data files stored in the memory device.

Figure 3:
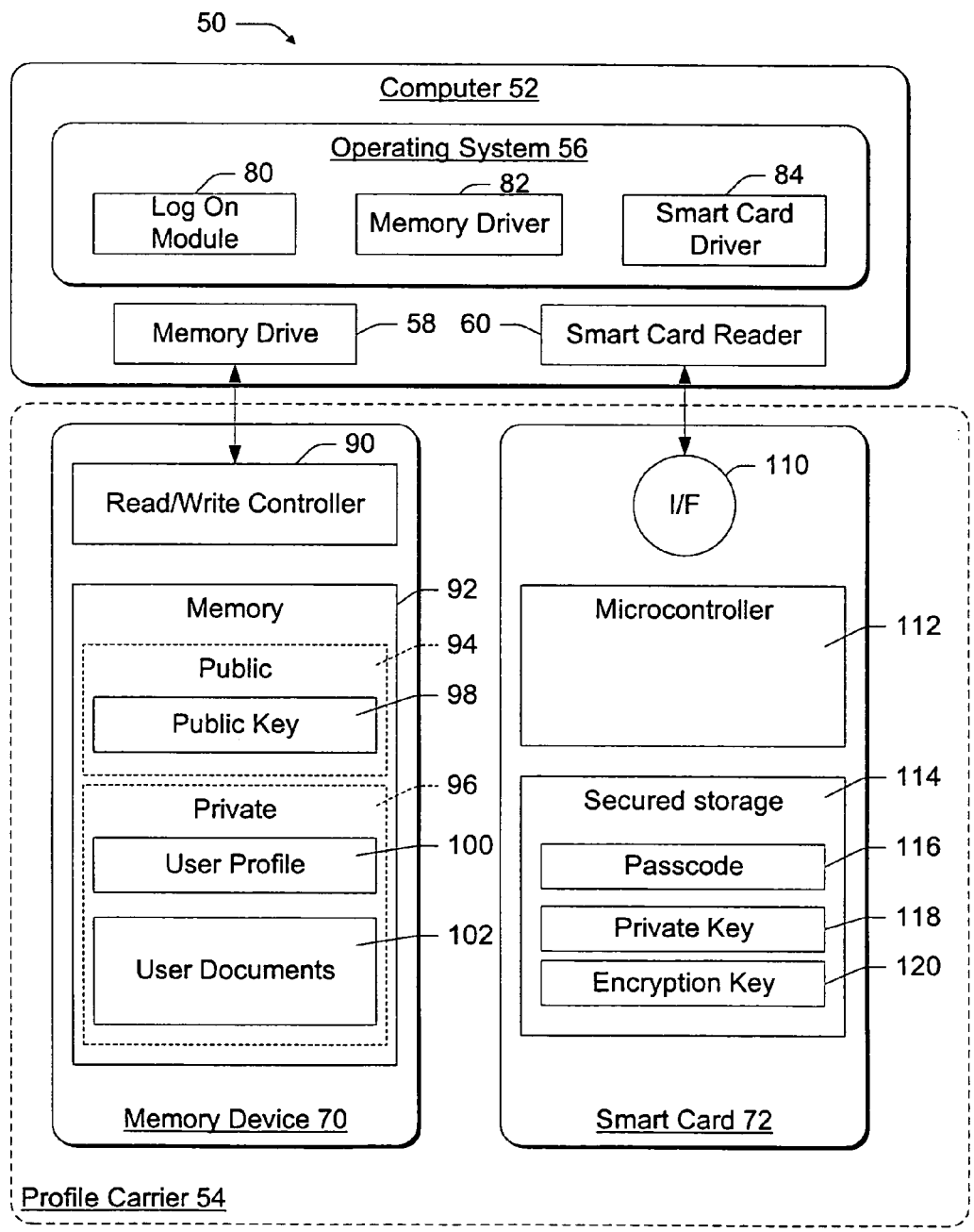
FIG. 3 is a block diagram of the system components, including the computer operating system, smart card, and memory device.

FIG. 3 shows functional components in the computer system 50. Computer 52 includes operating system 56, memory drive 58, and smart card reader 60. The operating system 56 has a logon module 80 to facilitate the user logon process. For a Windows NT operating system from Microsoft Corporation, the logon module 80 is the dynamic link library "msgina.dll", a component used by the user logon facility "winlogon.exe". The operating system 56 also has a memory driver 82 and a smart card driver 84. The drivers 82 and 84 detect when a memory device 70 and smart card 72 are inserted into the respective memory drive 58 and smart card reader 60.

The profile carrier 54 comprises the memory device 70 and smart card 72. The memory device 70 has a read/write controller 90 and persistent memory 92. The memory 92 is partitioned into a public area 94 and a private area 96. A public key 98 is stored in the public area 94 and can be exported from the memory device via the read/write controller 90. The public key 98 is from a public/private key pair assigned to the profile carrier 54, with the corresponding private key being kept on the smart card 72. A user profile 100 and data files 102 are stored in the private area 96 of memory 92. The controller 90 facilitates reading and writing data to the memory device 92 and is capable of protecting the private storage 96 from illegitimate access.

The detailed internal architecture of smart cards varies greatly between smart cards from different manufacturers. For purposes of this discussion, a very simplified view of a typical smart card will be used. The smart card 72 has an interface 110, a microcontroller or processor 112, and secured storage 114. The microcontroller 112 is preprogrammed to perform certain cryptographic functions and can read from and write to the secured storage 114. The microcontroller 112 responds to commands sent via the interface 110 and can send data in response to those commands back to the interface.

In this simplified smart card 72, the secured storage 114 contains a passcode 116, a private key 118, and an encryption key 120. Before it will perform any cryptographic functions involving private key 118, the smart card 72 is unlocked by a command sent in via the interface 110 that specifies a passcode matching the stored passcode 116. Once unlocked, the smart card can be instructed by other commands to perform cryptographic functions that involve the use of the private key 114, without making the private key available outside of the smart card. The programming of the microcontroller 112 is designed to avoid exposing the passcode 116 and private key 118. Simply, there are no commands that can be issued to the microcontroller 112 via the interface 110 that will reveal the values of the passcode or the private key. In this manner, the smart card prevents a foreign application from ever inadvertently or intentionally mishandling the passcode and key in a way that might cause them to be intercepted and compromised. In constructing smart cards, manufacturers take additional measures to ensure that the secured storage is inaccessible even when the smart card is disassembled and electronically probed.

Portable Profile Operation

The system described above enables a user to transport a user profile and personal data files on a secured portable device from one computer to the next. The user can upload the user profile from the portable device to the computer and automatically configure the computer to his/her likes and preferences. In this manner, every computer "looks and feels" the same to the user, based on that user's settings and preferences.

The profile carrier is configured as a smart card secured flash memory system that alternately enables access to the user profile in flash memory when the smart card is present, while disabling access when the smart card is absent. No connection to a server for remote downloading of profiles is necessary, as the portable profile carrier contains all of the information needed by the computer for customized configuration.

To access the user profile, the user inserts the memory device 70 into the memory drive 58 and inserts the smart card 72 into the smart card reader 60. Authorization to access the user profile is achieved through a two-phase authentication process. One phase involves user authentication in which the smart card 72 authenticates the user via a passcode challenge. The second phase is a carrier authentication in which the smart card 72 authenticates the memory device 70 as carrying the profile of the user.

Figure 4:
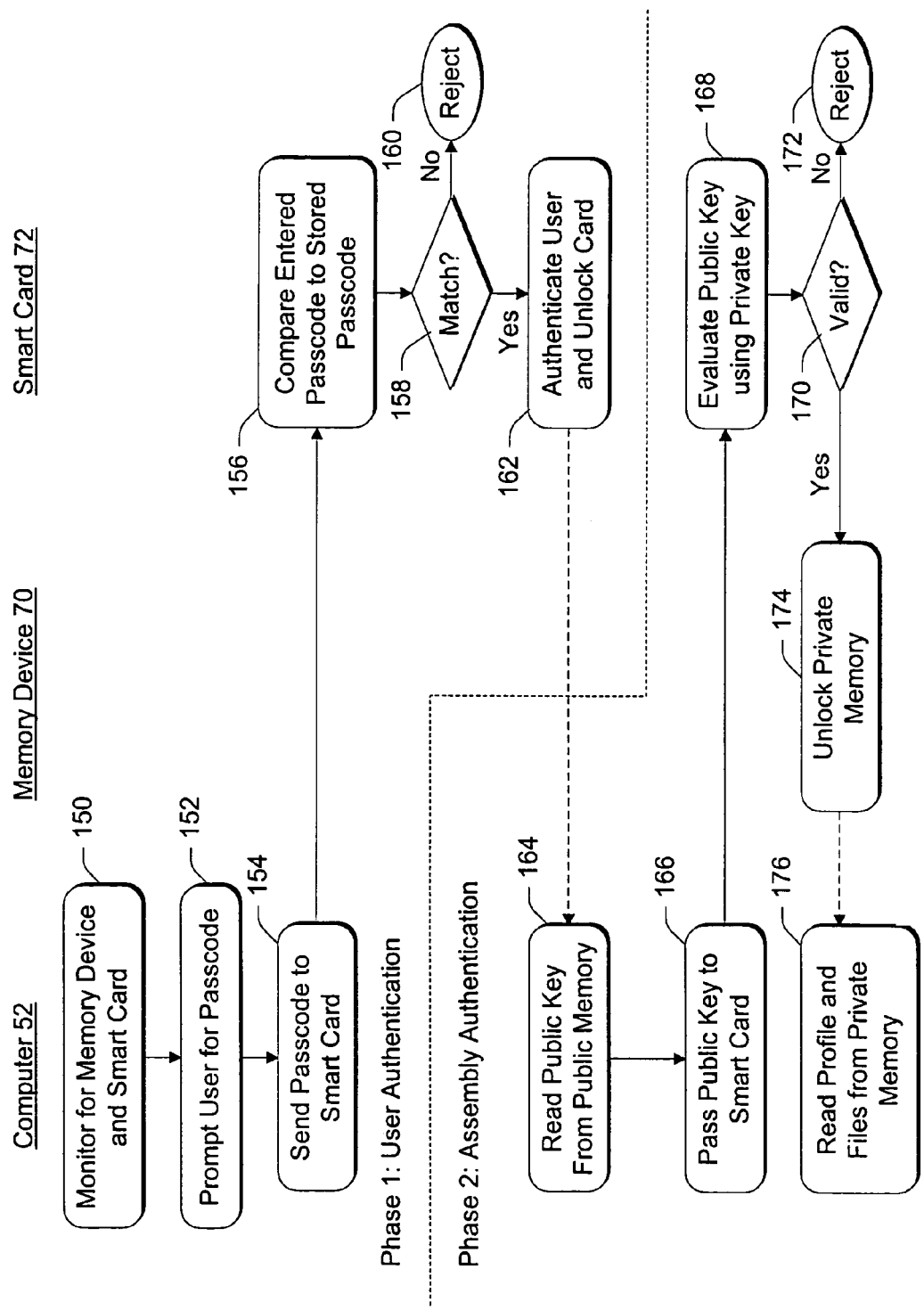
FIG. 4 is a flow diagram showing steps in a two-phase authentication process for accessing user profile and data files carried on the profile carrier.

FIG. 4 shows steps in the two-phase authentication process that enables access to the user profile and data files. The steps are performed in a combination of hardware and software resident at the computer 52 and smart card 72. The method is also described with additional reference to the system illustrated in FIG. 3.

At step 150, the computer 52 monitors for insertion of the memory device 70 and smart card 72 into their respective drives. In one implementation, the logon module 80 of operating system 56 (i.e., "msgina.dll") continually monitors the memory drive 58 and smart card reader 60. Once the device and card are identified, the logon module 80 proceeds with the logon procedure.

At step 152, the computer operating system 56 prompts the user via a dialog box or other type window to enter a passcode, such as a PIN (Personal Identification Number). After the user enters the passcode, the smart card driver 84 sends the user-supplied passcode to the smart card 72 via the smart card reader 60 (step 154).

The smart card microcontroller 112 compares the user-supplied passcode to the passcode 116 stored in secured storage 114 (step 156). If the two fail to match (i.e., the "no" branch from step 158), the microcontroller 112 rejects the entered passcode and returns a failure notice (step 160). Conversely, if the two match, the user has been authenticated and the microcontroller 112 will now accept commands that involve cryptographic operations involving the private key 118.

In this manner, the smart card is associated with a particular user through the passcode. Only the legitimate user is assumed to know the passcode and hence, only the legitimate user is able to unlock the smart card.

This passcode challenge completes the user authentication phase of the process. The carrier authentication phase is subsequently initiated to determine whether the memory device carries the data of the authenticated user. This phase employs public key cryptography to make the determination. As noted above, the composite profile carrier is assigned a pair of complementary public and private keys, with the public key 98 being stored on memory device 70 and the corresponding private key 118 being stored in the secured storage 114 of smart card 72.

At step 164, the memory driver 82 reads the public key 98 from the memory device 70 via the memory drive 58. The memory driver 82 passes the public key 98 to the smart card 72 via the smart card driver 84 and smart card reader 60 (step 166). The smart card microcontroller 112 runs a process using the public key 98 and the private key 118 to determine whether the keys are complementary (step 168). This step determines whether the memory device 70 and smart card 72 are associated with one another and form the user's profile carrier, thereby linking the legitimate user to the user profile and personal data files stored in the memory device of the profile carrier.

If the public key is not valid (i.e., the "no" branch from step 170), the microcontroller 112 rejects the entered public key and returns a failure notice indicating that the memory device does not correspond to the smart card or user (step 172). On the other hand, assuming the public key checks out (i.e., the "yes" branch from step 170), the smart card instructs the read/write controller 90 on the memory device 70 to enable access to the user profile and data files in the private area 96 of the memory 92 (step 174). At this point, the computer is permitted to read the user profile and data files from the memory device 70 and normal logon processes are continued using the profile data from the memory (step 176). The computer configures the computer according to the user profile. The memory is also made available as a peripheral storage device for the computer. The operating system presents an icon or name in a file system user interface to inform the user that the memory is addressable and available.

After the user completes a session at this computer, the user can save any files or other data to the flash memory. The user is then free to remove the profile carrier from the computer and carry it to another computer. The user can then repeat the same operation described above to import his/her profile to the next computer. As a result of this architecture, one source of security is that both user authentication and possession of both components of the profile carrier during logon are employed to gain access to the user profile and data files.

The scheme described is secure if the computer 52 can be trusted to correctly pass the public key 98 to the smart card 72, and correctly pass the accepts/reject response from the smart card 72 to the read/write controller 90.

To further protect the private contents in the memory device 70, the contents can be encrypted (e.g. DES encryption) using a key that can only be obtained from the smart card 72 after the smart card has been successfully unlocked by the user providing the correct passcode. In this case, the computer 52 sends a command to the smart card 72 via the interface 110 to obtain the encryption key 120, which it passes to the read/write controller 90. The read/write controller uses this key to decrypt the user profile 100 and user documents 102 as the computer makes requests to read this data. Similarly when this data is written back to the memory device 70 the read/write controller 90 uses the key to encrypt the data before writing it to the private memory area 96.

CONCLUSION

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A system for porting user data from one computer to another, comprising:
    a memory device configured to store the user data and a public key; and
    a smart card associated with a user that alternately enables access to the user data on the memory device when both the memory device and smart card are interfaced with a common computer and disables access to the user data when the smart card is absent;
    wherein the public key is sent from the memory device to the smart card, wherein the smart card contains a private key, and wherein access to the user data in the memory device is enabled upon verification that the public key and the private key are associated as a public/private key pair such that the public and private keys are components of an asymmetric cryptographic system whereby data encrypted by the public key is decrypted by the private key; and wherein the smart card is configured to pass an encryption key to the memory device for decryption of data read from the memory device, and for encryption of data to be stored on the memory device.

2. An assembly as recited in claim 1, wherein the smart card stores a passcode and access to the user data in the memory device is enabled upon authentication of a user-supplied passcode to the passcode stored on the smart card.

3. An assembly as recited in claim 1, wherein the memory device stores a user's profile that can be used for computer configuration.

4. A profile carrier comprising:
   a smart card to store a passcode and a private key from a private/public key pair; and
   a memory device to store a user profile and a public key from the private/public key pair;
   wherein, when the smart card and the memory device are interfaced with a common computing unit, the smart card is configured to permit use of the private key following validation of a user-entered passcode with the stored passcode and to authenticate, using the private key, the public key sent to the smart card from the memory device, wherein the authentication requires that the public and private keys are components of an asymmetric cryptographic system whereby data encrypted by the public key is decrypted by the private key;
   wherein the profile carrier is configured to permit access to the user profile stored on the memory device upon successful authentication of the public key at the smart card; and
   wherein the smart card is configured to pass an encryption key to the memory device for decryption of data read from the memory device, and for encryption of data to be stored on the memory device.

5. A computer system, comprising:
   a computing unit having a memory drive and a smart card reader; and
   the profile carrier as recited in claim 4, wherein the memory device is interfaced with the computing unit via the memory drive and the smart card is interfaced with the computing unit via the smart card reader.

6. A computer system, comprising:
   a computer having an interface; and
   a profile carrier adapted to use the interface, the profile carrier comprising a smart card associated with a user, the smart card containing a private key, and a memory device having data memory to store a user's profile, the memory device storing a public key associated with the private key, wherein the smart card alternately enables access to the user's profile when present and disables access to the user's profile when absent;
   wherein the system is configured to send the public key from the memory device to the smart card, and wherein access to the user data in the memory device is enabled upon verification that the public key and the private key are associated as a public/private key pair such that the public and private keys are components of an asymmetric cryptographic system whereby data encrypted by the public key is decrypted by the private key; and wherein the smart card is configured to pass an encryption key to the memory device for decryption of data read from the memory device, and for encryption of data to be stored on the memory device.

7. A computer system as recited in claim 6, wherein the smart card stores a passcode and is configured to authenticate a user-supplied passcode entered into the computer as a condition for enabling access to the user data.

8. A computer system, comprising:
   a computer having a memory drive and a card reader;
   a portable profile carrier to port a user's profile for configuration of the computer, the profile carrier comprising:
      (a) an integrated circuit (IC) card associated with the user that can be interfaced with the computer via the card reader; and
      (b) a memory device to store the user's profile, the memory device being interfaced with the computer via the memory drive, the IC card enabling access to the user data on the memory device;
   wherein when the profile carrier is interfaced with the computer, the user's profile is accessible to configure the computer;
   wherein the IC card stores a passcode and a private key of a public/private key pair;
   wherein the memory device stores a public key of the public/private key pair; and
   wherein the IC card is configured to authenticate a user-supplied passcode entered into the computer as a condition for enabling access to the private key and to authenticate the public key sent from the memory device to the IC card, wherein the authentication requires confirmation that the public and private keys are components of an asymmetric cryptographic system whereby data encrypted by the public key is decrypted by the private key; and
   wherein the smart card is configured to pass an encryption key to the memory device for decryption of data read from the memory device, and for encryption of data to be stored on the memory device.

9. A computer system as recited in claim 8, wherein the IC card stores a passcode and is configured to authenticate a user-supplied passcode entered into the computer as a condition for enabling access to the user's profile.

10. A method for porting a user profile for a computer, comprising:
   storing a user profile in memory of a smart card secured profile carrier, the smart card secured profile carrier having a smart card that selectively enables access to the user profile in the memory;
   interfacing the smart card secured profile carrier with the computer;
   sending a public key, stored in the memory, to the smart card;
   verifying that a private key, stored on the smart card, is associated with the public key, received from the memory, as a public/private key pair, wherein the association requires that the public and private keys are components of an asymmetric cryptographic system whereby data encrypted by the public key is decrypted by the private key, and wherein the public key is stored within the memory and sent to the smart card to facilitate the verifying;
   reading the user profile from the memory, upon a successful verification, for use in configuring the computer; and passing an encryption key, from the smart card and to the memory device, for decryption of data read from the memory device, and for encryption of data to be stored on the memory device.

11. A method as recited in claim 10, further comprising interfacing the smart card secured profile carrier with a different second computer and reading the user profile from the memory for use in configuring the second computer.

12. A method comprising:
storing user data and a public key on a portable memory device;
storing a private key on a smart card;
interfacing the smart card and the portable memory device with a computer;
sending the public key to the smart card;
verifying compatibility of the public key and the private key, wherein the verification requires that the public and private keys are components of an asymmetric cryptographic system whereby data encrypted by the public key is decrypted by the private key;
passing an encryption key, from the smart card to the memory device, for decryption of data read from the memory device, and for encryption of data to be stored on the memory device; and
allowing, in response to the verified compatibility, access to the user data on the portable memory device.

13. A method comprising:
storing user data in a portable memory device;
storing a public key in the memory device;
storing a private key on the smart card, the card-resident key corresponding to the device-resident key;
storing a passcode on the smart card;
interfacing the smart card with a computer;
interfacing the portable memory device with the computer;
receiving a user-entered passcode;
permitting use of the private key following validation of the user-entered passcode with the
passcode stored on the smart card;
passing the public key from the memory device to the smart card;
authenticating, at the smart card, the public key using the private key, thereby confirming that the public key and the private key are associated as a public/private key pair, such that the public and private keys are components of an asymmetric cryptographic system whereby data encrypted by the public key is decrypted by the private key;
permitting access to the user data stored in the memory device upon successful authentication of the public key; and
passing an encryption key, from the smart card and to the memory device, for decryption of data read from the memory device, and for encryption of data to be stored on the memory device.

14. In a system having a computer and a smart card secured profile carrier, the smart card secured profile carrier having memory to store a user profile and a smart card separate from the memory, computer-readable media resident on the profile carrier having executable instructions comprising:
receiving a user-supplied passcode from the computer;
authenticating the user-supplied passcode with a passcode stored on the smart card;
enabling access to a private key on the smart card upon successful authentication of the user-supplied passcode;
sending a public key from the memory to the smart card;
authenticating the public key using the private key, thereby confirming that the public key and the private key are a public/private key pair, such that the public and private keys are components of an asymmetric cryptographic system whereby data encrypted by the public key is decrypted by the private key;
enabling access to the user profile in the memory upon successful authentication of the public key; and
passing an encryption key, from the smart card and to the memory device, for decryption of data read from the memory device, and for encryption of data to be stored on the memory device.

* * * * *